Aug. 1, 1944.                H. R. LIPPITT                2,354,818
                          ELECTRIC SPHYGMOMETER
                          Filed Nov. 1, 1941
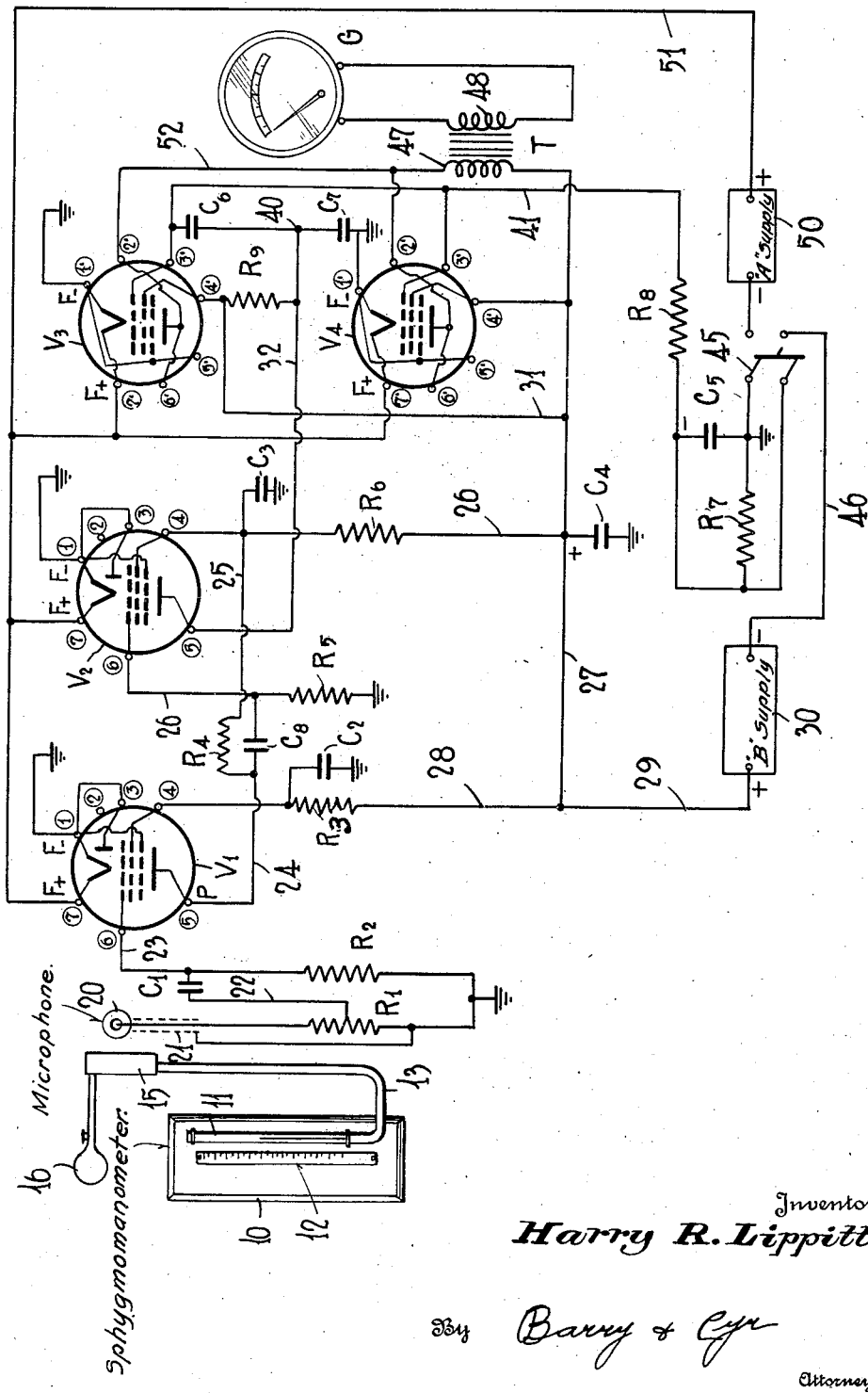
Inventor
Harry R. Lippitt,
By Barry & Cyr
Attorneys Patented Aug. 1, 1944

2,354,818

UNITED STATES PATENT OFFICE 2,354,818

ELECTRIC SPHYGMOMETER

Harry R. Lippitt, New York, N. Y.

Application November 1, 1941, Serial No. 417,549

4 Claims. (Cl. 128—2.05)

This invention relates to an electric sphygmometer and more particularly to an improved arrangement for measuring and indicating the strength of the pulse beat and the utilization thereof as an adjunct to a sphygmomanometer for obtaining accurate systolic and diastolic blood pressure readings.

It is the object of the present invention to provide a sensitive arrangement for indicating with exactitude the incidence of the systolic and diastolic blood pressures in order that the readings on the sphygmomanometer may be noted at such times with no guesswork.

It is the object of the present invention to provide a light and compact instrument which is rugged though extremely sensitive in order to derive visual indications of the pulse vibrations, which will serve as a definite signal to note the blood pressure readings on the sphygmomanometer which may be registering at the particular time that the visual indicating signal is given. Such an arrangement eliminates all guesswork and fixes definitely the time that the blood pressure reading should be noted, representing a marked improvement over the prior practice of obtaining this indication by means of a stethoscope or like arrangements used heretofore, which are subject to errors occasioned by extraneous vibrations or by the defective or uncertain hearing of the operator of the stethoscope.

The present invention proceeds upon the principle of providing a crystal microphone in lieu of the stethoscope which is usually employed in the measuring of blood pressures, which microphone is characterized by high sensitivity. The sphygmomanometer used in conjunction with the crystal microphone may be of any conventional type, the scale readings of which may be noted on a column of mercury, or on a circular dial. In such arrangements, a rubber bag cuff is wrapped around the upper arm and is inflated by a hand bulb. This cuff may be connected by rubber tubing to a sphygmomanometer or measuring device in the form of a sealed column of mercury. In accordance with the present invention, the crystal microphone is applied over the artery below the cuff and pressure is applied by pumping air into the rubber cuff to compress the brachial artery in the upper arm. As the pressure is applied, the pulse causes mechanical vibrations of the crystal microphone which are translated into electrical variations which are imposed upon a multi-stage amplifying unit, at the output of which is preferably disposed an electrical indicating instrument which clearly and visibly vibrates corresponding to the vibrations imposed upon the crystal microphone. The pressure is applied until no regular vibrations are recorded on the electrical indicating instrument. The air is then gradually permitted to escape from the cuff until the pulse again causes the mechanical vibration of the crystal microphone. The reading at this point on the circular scale or column of mercury of the sphygmomanometer indicates the systolic pressure or the highest pressure in the arteries during the contraction of the heart. The deflation of the cuff is continued and that point on the scale when the last vibrations of the disappearing pulse is imposed upon the crystal microphone and is translated into the vibrations of the indicating instrument at the output of the amplifying unit, is the diastolic pressure or the lowest pressure in the arteries during diastole or relaxation of the heart muscle between beats.

Thus, the pulse variations which are applied to the sphygmometer are indicated positively by the action of the pulse alone without interference of any other extraneous body vibrations or vibrations in the room in which the testing operation is being undertaken, and without possibility of mistaking the points at which the relative intensities of the pulse beats undergo marked changes.

Other objects and purposes of the invention will appear from the following detailed description of the invention following hereinafter taken in conjunction with the accompanying drawing, wherein is shown one preferred mode of execution thereof.

As shown in the drawing, the sphygmomanometer 10 is exemplified by a sealed column of mercury 11 adjacent to a suitable scale 12. The column of mercury is connected to the rubber cuff 15 through the intermediary of the rubber tubing 13. The cuff 15 is adapted to be inflated by the hand bulb 16 which is also provided with means for allowing the air to escape gradually in a manner well known in the art of such devices.

The sphygmometer or indicating device adapted to be used in conjunction with this sphygmomanometer 10 is illustrated schematically in the drawing and essentially consists of a crystal microphone 20 at the input of the device which is designed to have impressed thereupon the pulse beats, the vibrations of which are amplified by means of thermionic amplifiers to give a visible indication of the vibrations corresponding to those impressed upon the microphone at the output of the amplifier on the galvanometer instrument G, the needle of which will swing correspondingly to the vibrations impressed on the crystal microphone.

The crystal microphone 20 comprises a vibratile crystal having characteristic capability of transforming mechanical pressures imposed thereupon into electrical variations. These electrical variations are amplified through a plurality of amplifying stages to give a visible indication which reliably indicates the pulse vibrations. This represents a marked improvement over the aural indications normally obtained by the use of a stethoscope. Although various arrangements may be devised for the amplification of the electrical variations produced by microphone, I have found the one illustrated in the drawing to be highly sensitive and productive of excellent results.

The conductor leading from the microphone 20 to the amplifier is enclosed in a sheathed cable 21 which is suitably grounded. A variable resistor $R_1$ operates as a variable gain control which is coupled to the input of the first amplifier $V_1$ through capacity $C_1$ and resistor $R_2$. The amplifier $V_1$ may be a miniature type diode-pentode which is designated commercially as the 1S5 tube. The diode element in the tube is connected to the filament and the tube in the present installation functions merely as an audio frequency pentode characterized by a high gain. The tube terminals 1 to 7 are designated in the conventional manner. The filament terminals are energized from a source of "A" supply 50, one end of which is grounded. The control grid 6 is connected by conductor 23 to the coupling elements $C_1$ and $R_2$ from the microphone. The output of the amplifier, which is connected with the plate terminal 5, includes the conductor 24 in which is inserted the coupling condenser $C_2$ for impressing the amplified energy of the amplifier $V_1$ across the input circuit of the next amplifier $V_2$ across its grid resistance $V_3$. The plate resistor $R_4$ is connected with conductor 24 and conductors 25, 26, 27 and 29 to the positive terminal of the "B" supply 30, which may be of 45 or 67.5 volts, to impose the necessary positive potential on that amplifier. The resistor $R_3$ in series with the screen grid 4 reduces the positive potential applied to that element by the necessary amount, which resistor is by-passed by the condenser $C_3$, which operates as a decoupling medium to exclude any variable effects upon the plate supply occasioned by the audio frequencies in the amplifier circuit.

The second stage of amplification is similar to the first and the amplifier $V_2$ is likewise of the 1S5 type. The plate 5 in this stage is energized from the plate supply 30 through the conductor 32, resistor $R_5$, conductors 31, 27 and 29 and plate supply 30. The screen grid potential is likewise reduced by the resistor $R_6$ which is by-passed by condenser $C_3$ functioning in the same manner as above.

The output from the second stage of amplification flowing through conductor 32 is impressed at point 40 on condensers $C_6$ and $C_7$ in order to capacitively couple the output of the tube $V_2$ with the inputs of the tubes $V_3$ and $V_4$ which are arranged in parallel. These tubes are miniature type power amplifier pentodes designated commercially as the 1S4 type, which are characterized by high efficiency and good power sensitivity.

The seven terminals of the amplifiers $V_3$ and $V_4$ are designated in the drawing according to standard practice, except that these are primed in order to distinguish them from the terminals of the amplifiers $V_1$ and $V_2$. The energy which is impressed across the grids 3' in parallel is amplified by the tubes and appears in the output circuit connected with the plates 2' in conductor 52, in which is disposed the primary winding 47 of audio transformer T. The secondary winding 48 of this transformer has in circuit therewith the electrical indicating instrument G which serves to indicate visibly the variations which are imposed upon the microphone in the input circuit.

The electrical connections for energizing the circuits are completed by the closing of a switch 45 which operates to complete the circuit for energizing the filaments of the several tubes through conductor 51, the "A" supply 50 and ground. This switch 45 also completes the connections for the "B" supply 30 to the various plates and screen grids. A resistor $R_8$, which may be 3 megohms, is provided in conductor 41 which is connected to the grids of tubes $V_3$ and $V_4$ and operates as a grid leak. The resistor $R_7$ serves to impose the proper bias on the grids of the last two amplifiers with respect to the ground. Condensers $C_4$ and $C_5$ of large capacity may be electrolytic condensers.

I found the following values applied to the various elements to result in a highly satisfactory and sensitive amplifying arrangement:

$R_1$=5 megohms
$R_2$, $R_5$=10 megohms
$R_3$, $R_4$, $R_8$=3 megohms
$R_6$, $R_6$=¾ to 1 megohm
$R_7$=1000 ohms
$C_1$=0.001 mfd.
$C_2$=0.1 to 1 mfd.
$C_3$=0.1 to 1 mfd.
$C_4$=10 mfd.
$C_5$=25 mfd.
$C_6$=0.005 mfd.
$C_7$=0.001 mfd.
$C_8$=0.001 mfd.

The "A" supply for the tubes, 50, consists of a 1.4 volt cell while the "B" supply may be 67½ to 90 volts. I have found an audio transformer particularly suitable in which the primary winding has a resistance of 700 ohms while the secondary winding resistance is 1 to 2 ohms. The indicating instrument G is referably a D'Arsonval galvanometer having a capacity of 0 to 100 to 200 microamperes. The indications are also obtainable by the use of a millivoltmeter. Dry rectifiers may be used in the indicating circuit.

While I have shown my sphygmometer particularly adapted for use as an adjunct to the measuring of blood pressures in association with a sphygmomanometer, the same may be found useful in other applications where a sensitive instrument is desired for the measuring of the strength of the pulse beats. The crystal microphone described herein utilizes a piezo-electric crystal, but any device characterized by the same behavior or which has the capability of transforming a mechanical stress to an electrical variation may be employed.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. In combination with a sphygmomanometer for measuring blood pressure, a sphygmometer for indicating pulse beats which comprises a crystal microphone adapted to be placed in contact with a person in close proximity to an artery and to be subjected to the pulse vibrations, a pair of successive resistance-coupled thermionic amplifying stages connected with said microphone for amplifying the electrical variations produced by the pulse vibrations acting on said crystal microphone comprising two successive miniature type audio-frequency pentode tubes, a pair of miniature type power-output pentodes connected in parallel and adapted to amplify further the output energy from said first stages, and an electric meter connected to the output of said last-mentioned pentodes for visibly indicating the pulse beat vibrations by the variations of the readings registered on said electric meter.

2. In combination with a sphygmomanometer for measuring blood pressure, a sphygmometer for indicating pulse beats which comprises a crystal microphone adapted to be placed in contact with a person in close proximity to an artery and to be subjected to the pulse vibrations, a plurality of thermionic amplifying stages connected to said microphone, and an indicating device at the output of said amplifying stages for clearly and visibly indicating the points at which the systolic and diastolic blood pressure readings on the sphygmomanometer should be noted corresponding to the indication of the pulse beats on said sphygmometer.

3. In combination with a sphygmomanometer for measuring blood pressure, a sphygmometer for indicating pulse beats which comprises a crystal microphone adapted to be placed in contact with a person in close proximity to an artery and to be subjected to the pulse vibrations, a plurality of thermionic amplifying stages connected to said microphone, and an electric meter connected at the output of said amplifying stages for visibly indicating the pulse beat vibrations by the variations of the readings registered on said electric meter whereby is indicated the points at which the systolic and diastolic blood pressure readings on the sphygmomanometer should be noted corresponding to the indication of the pulse beats on said sphygmometer.

4. The method of measuring blood pressure which comprises accurately indicating the points of systolic and diastolic blood pressures by imposing the pulse beats of the body upon a crystal microphone placed in direct contact with a person in close proximity to an artery, amplifying the electrical variations resulting from the mechanical vibrations of the crystal microphone, and visibly indicating the time of occurrence and intensity of said vibrations to signify the correct periods for reading said blood pressures.

HARRY R. LIPPITT.